United States Patent
Froehlich et al.

(10) Patent No.: US 10,966,108 B2
(45) Date of Patent: Mar. 30, 2021

(54) OPTIMIZING RADIO CELL QUALITY FOR CAPACITY AND QUALITY OF SERVICE USING MACHINE LEARNING TECHNIQUES

(71) Applicant: NetScout Systems, Inc, Westford, MA (US)

(72) Inventors: Robert William Froehlich, McKinney, TX (US); Ralf Kreher, Berlin (DE)

(73) Assignee: NetScout Systems, Inc, Westford, MA (US)

( * ) Notice: Subject to any disclaimer, the term of this patent is extended or adjusted under 35 U.S.C. 154(b) by 27 days.

(21) Appl. No.: 16/033,017

(22) Filed: Jul. 11, 2018

(65) Prior Publication Data
US 2020/0022006 A1 Jan. 16, 2020

(51) Int. Cl.
| | | |
|---|---|---|
| H04W 24/08 | (2009.01) | |
| G06N 5/04 | (2006.01) | |
| G06F 11/07 | (2006.01) | |
| H04L 12/24 | (2006.01) | |
| H04W 24/10 | (2009.01) | |

(52) U.S. Cl.
CPC ........... *H04W 24/08* (2013.01); *G06F 11/079* (2013.01); *G06N 5/043* (2013.01); *H04L 41/0631* (2013.01); *H04L 41/0681* (2013.01); *H04L 41/16* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2010/0057651 | A1* | 3/2010 | Fung | G06N 7/005 706/12 |
| 2010/0138368 | A1* | 6/2010 | Stundner | G06N 20/00 706/12 |
| 2011/0231704 | A1* | 9/2011 | Ge | G06F 11/0709 714/26 |
| 2014/0279718 | A1* | 9/2014 | Southey | G06N 5/04 706/11 |
| 2016/0036718 | A1* | 2/2016 | Shingari | H04L 41/5074 709/226 |
| 2016/0205697 | A1* | 7/2016 | Tan | H04W 24/02 370/329 |
| 2017/0019291 | A1* | 1/2017 | Tapia | G06N 20/00 |
| 2017/0099179 | A1* | 4/2017 | Iwamura | H04L 41/0659 |
| 2019/0268366 | A1* | 8/2019 | Zeng | H04L 63/1433 |

\* cited by examiner

*Primary Examiner* — Diane L Lo
(74) *Attorney, Agent, or Firm* — Locke Lord LLP; Scott D. Wofsy; Christopher J. Capelli

(57) ABSTRACT

A method for optimizing a radio access network includes receiving at least one area of the radio access network to be analyzed from a user and receiving a desired outcome from a user. A plurality of network monitoring parameters related to a user requested analysis is identified. The identified plurality of network monitoring parameters is correlated. A root cause analysis is performed using an automated classification model based on the correlated plurality of network monitoring parameters. A recommendation related to the desired outcome is generated based on the performed root cause analysis.

20 Claims, 6 Drawing Sheets

OPTIMIZING RADIO CELL QUALITY FOR CAPACITY AND QUALITY OF SERVICE USING MACHINE LEARNING TECHNIQUES

FIELD OF THE INVENTION

Embodiments of the present invention relate generally to telecommunications, and specifically to optimizing radio cell quality for capacity and quality of service using machine learning techniques.

BACKGROUND OF THE INVENTION

Typically network operations have a variety of hardware and software systems for managing their networks. For example, network operator's Radio Access Network (RAN) operations and performance departments monitor and optimize their networks using known in the art systems for performance management which may utilize Network Equipment Manufacturer (NEM) cell based counters. The use of the geo-locating subscriber Radio Resource Control Signaling (RRC), Media Access Control (MAC) and radio frequency (RF) conditions found in measurement reports and MAC channel feedback typically allow improvement in prior knowledge down to sub-cell granularity levels. Such geo-located information is typically rendered in a geographical user interface. However, many troubleshooting, parameter tuning and small cell planning approaches require manual so called 'best guess' methods. In many cases carrier revenue is deteriorating due to revenue loss to 'over the top services', such as, but not limited to, Facebook, Skype, Twitter and the like, increasingly making such carriers last mile telecommunication providers. Consequently, there is a need for carriers to dramatically reduce their operating expenses in order to remain viable and profitable.

One representative solution for reduction of carriers' operating expenses is employment of Self-Organizing Network (SON) functions. SON functions are functions that automatically monitor network operations and parameters, and user actions, and automatically take actions to optimize network operations. SON functions are typically structured hierarchically—with a high-level SON function (for example, a Network Manager (NM)) operating to optimize the overall network, and a plurality of lower-level SON functions (for example, at each Network Element (NE)) locally optimizing the NE, under the control and direction of the high-level SON function.

For many telecommunication carriers there is a need to advance implementation of SON functions of automatic network monitoring operations beyond neighbor cell management.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for optimizing a radio access network includes receiving at least one area of the radio access network to be analyzed from a user and receiving a desired outcome from a user. A plurality of network monitoring parameters related to a user requested analysis is identified. The identified plurality of network monitoring parameters is correlated. A root cause analysis is performed using an automated classification model based on the correlated plurality of network monitoring parameters. A recommendation related to the desired outcome is generated based on the performed root cause analysis.

In another aspect, a system for optimizing a radio access network includes a processor and a memory device coupled to the processor. The memory device contains a set of instructions that, when executed by the processor, cause the processor to receive at least one area of the radio access network to be analyzed from a user and receive a desired outcome from a user and to identify a plurality of network monitoring parameters related to a user requested analysis. The set of instructions, when executed by the processor further cause the processor to correlate the identified plurality of network monitoring parameters and to perform a root cause analysis using an automated classification model based on the correlated plurality of network monitoring parameters. The set of instructions, when executed by the processor also cause the processor to generate a recommendation related to the desired outcome based on the performed root cause analysis.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
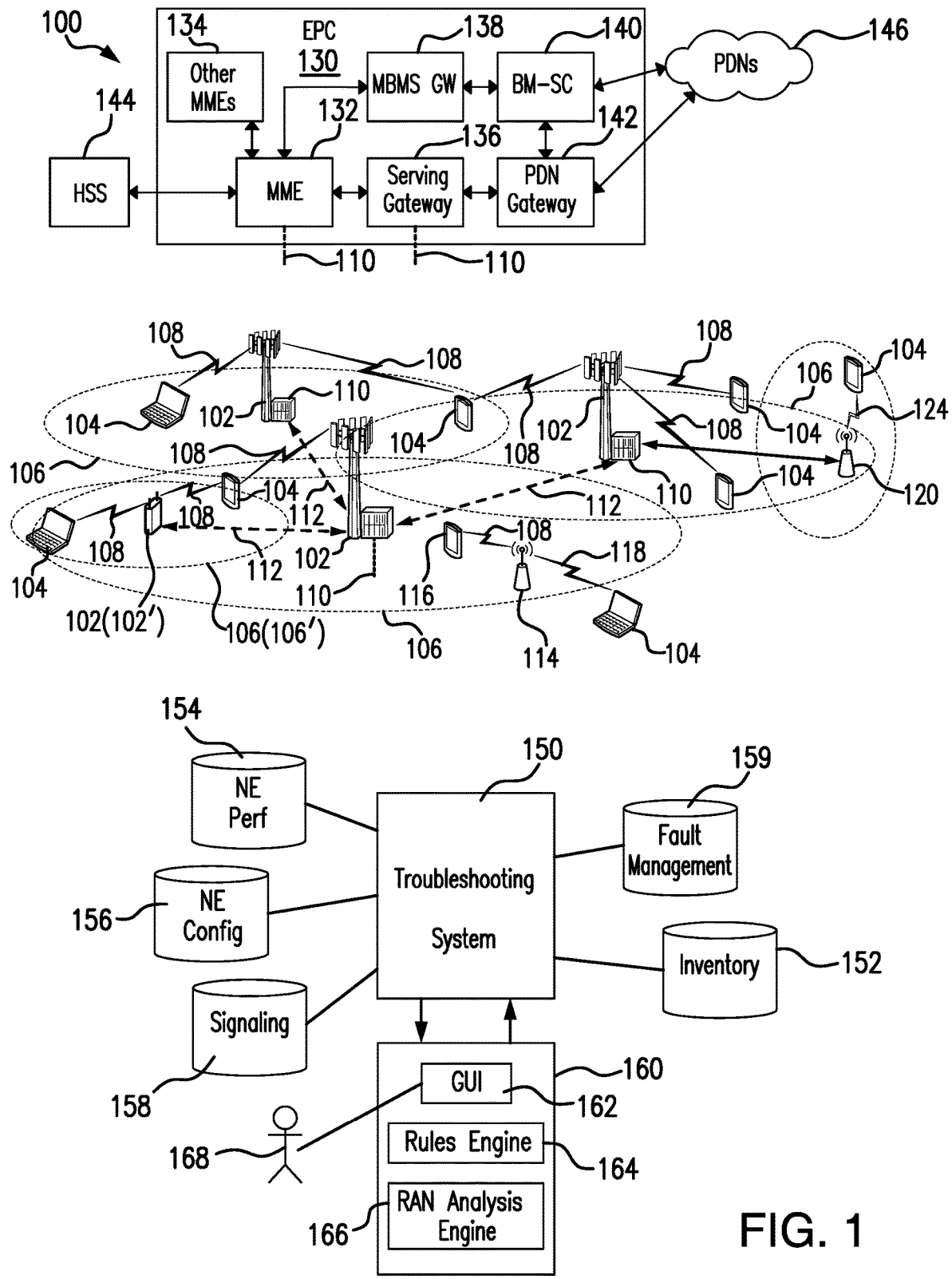
FIG. 1 illustrates an example communication network in accordance with an illustrated embodiment.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 130. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 130 through backhaul links 110 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 130) with each other over backhaul links 112 (e.g., X2 interface). The backhaul links 112 may be wired or wireless.

The base stations 102 may wirelessly communicate with the UEs 104. Each of the base stations 102 may provide communication coverage for a respective geographic coverage area 106. There may be overlapping geographic coverage areas 106. For example, the small cell 102' may have a coverage area 106' that overlaps the coverage area 106 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 108 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 108 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 114 in communication with Wi-Fi stations (STAs) 116 via communication links 118 in a 5 GHz unlicensed frequency spectrum. When communicating in an unlicensed frequency spectrum, the STAs 116/AP 114 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 114. The small cell 102', employing NR in an unlicensed frequency spectrum, may boost coverage to and/or increase capacity of the access network.

The gNodeB (gNB) 120 may operate in millimeter wave (mmW) frequencies and/or near mmW frequencies in communication with the UE 104. When the gNB 120 operates in mmW or near mmW frequencies, the gNB 120 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 120 may utilize beamforming 124 with the UE 104 to compensate for the extremely high path loss and short range.

The EPC 130 may include a Mobility Management Entity (MME) 132, other MMEs 134, a Serving Gateway 136, a Multimedia Broadcast Multicast Service (MBMS) Gateway 138, a Broadcast Multicast Service Center (BM-SC) 140, and a Packet Data Network (PDN) Gateway 142. The MME 132 may be in communication with a Home Subscriber Server (HSS) 144. The MME 132 is the control node that processes the signaling between the UEs 104 and the EPC 130. Generally, the MME 132 provides bearer and connection management. All user Internet protocol (IP) packets are transferred through the Serving Gateway 136, which itself is connected to the PDN Gateway 142. The PDN Gateway 142 provides UE IP address allocation as well as other functions. The PDN Gateway 142 and the BM-SC 140 are connected to the IP Services 146. The IP Services 146 may include the Internet, an intranet, an IP Multimedia Subsystem (IMS), a PS Streaming Service (PSS), and/or other IP services. The BM-SC 140 may provide functions for MBMS user service provisioning and delivery. The BM-SC 140 may serve as an entry point for content provider MBMS transmission, may be used to authorize and initiate MBMS Bearer Services within a public land mobile network (PLMN), and may be used to schedule MBMS transmissions. The MBMS Gateway 138 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 130 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Advantageously, various embodiments of the present invention contemplate a monitoring and troubleshooting system that efficiently and accurately evaluates signaling, performance and configuration data of both EPC 130 and RAN to identify at least one cause of reported and/or anticipated network related failures and applies procedural and iterative root cause analysis to provide automatic recommendations for resolving the reported network failures. According to an embodiment of the present invention, a troubleshooting system 150 may include, but not limited to, a computer server operatively coupled to each segment of access network 100 and to an operations support systems (OSS) platform (interchangeably referred to herein as the "network management platform"). At the highest level, the network management platform provides the computer resources required to perform various network management functions, such as billing, customer care, network management, inventory control, maintenance, trouble ticket reporting, surveillance and service provisioning. In some embodiments, the network management platform comprises a plurality of applications, such as performance, fault, configuration and security management applications. As shown in FIG. 1, troubleshooting system 150 may communicate with various data repositories maintained by the network management platform, such as, but not limited to network inventory database 152, network equipment performance database 154, network equipment configuration database 156, network signaling database 158, fault management database 159, and the like.

Network inventory 152 may be any database capable of storing data relating to access network 100. Network inventory 152 includes network discovered physical inventory, network discovered logical inventory, and planned network inventory. In one embodiment, network inventory database 152 stores information about network equipment, cell sites, IP transport, or the like. In some embodiments, network inventory 152 may store physical network information and logical network information. The physical network information specifies the physical components in the access network 100 and how the physical components are physically connected to one another in the access network 100. For example, the physical network information may include the number of machines, managed switching elements (e.g. message routers and broadband network gateway), and how the components are physically connected to one another in the monitored access network 100. The logical network information may specify the logical connections between a set of physical components in the monitored network 100 (e.g., machines) and a mapping of the logical connections across the physical components of the monitored access network 100. Additionally, network inventory 152 may store Network Function Virtualization (NFV) information. NFV, as described in the European Telecommunications Standards Institute (ETSI) group specification (GS) NFV 002 v1.1.1, entitled "Network Functions Virtualisation (NFV); Architectural Framework," published October 2013, which is incorporated herein as if reproduced in its entirety, consolidates many types of physical network devices onto one or more general purpose servers, switches, storage, and/or other general purpose network nodes. For example, NFV may implement network functions performed by a variety of physical network devices that include, but are not limited to switching elements, mobile network nodes, traffic analysis (e.g. deep packet inspection (DPI) and quality of service (QoS) measurement), application level optimization (e.g. application accelerators and content distribution networks (CDNs)), and security functions (e.g. firewall). By consolidating the physical network devices, NFV provides greater flexibility for access network 100 by implementing network functions that can be moved to and/or instantiated in various locations in the network 100 without the installation and configuration of new physical network devices.

Network equipment performance database 154 may store data collected by a performance management system. In access network 100, coverage areas 106 cover limited geographical areas. Performance database 154 may store performance counters and events for these cells among other performance related information. These counters provide information about the performance and traffic load in specific cells, such as cell capacity, the amount of signaling in specific cells, etc. The network equipment configuration database 156 stores data that defines a configuration for access network 100.

A session, call, or data record is created for each UE 104 using messages, signals, and/or data collected or intercepted by monitoring probes from various network interfaces. A monitoring system, such as monitoring probes and monitoring server (not shown in FIG. 1), may be coupled to interfaces and links in the network to passively monitor and collect signaling data from one or more interfaces in the network. The monitoring system may collect user plane and control plane data from the interfaces. The monitoring probes, may comprise, for example, one or more processors running one or more software applications that collect, correlate and analyze Protocol Data Units (PDU) and data packets from both RAN and EPC 130 network interfaces and links. All collected data may be stored in network signaling database 158. Another example of signaling data collected from access network 100 would be to obtain switching and routing table information or subscribers IP trace route information using well-known real time processing programs such as rtTrace.

Fault management database 159 preferably stores information related to a service related network fault events. The events may be collected from a distributed network event database representing different subsystems (transport, layer 3 control signaling, tunneled user plane, etc.) or protocol layers of access network 100. It is noted that fault management data can be aggregated on different levels, that is per cell, per event, per service, per area, etc., based on data obtained from RAN network elements and EPC 130 elements. However, common communication systems have in fact limited the set of possible fault events, for the reason that it may be difficult to represent all possible problem sources. For example, routers typically report lost packets. However, they do not report packet reordering. Packet reordering as such is not considered to be an important performance fault in transport networks. Nevertheless, there are services that are sensitive to high levels of reordering of packets. These types of fault events, packet reordering in routers, are therefore not detectable by fault management systems that are purely based on fault reporting from the network.

As shown in FIG. 1, troubleshooting system 150 may be communicatively connected to a knowledge base system (KBS) 160. In some embodiments, the KBS 160 may comprise a cloud-based system suited for complex tasks. According to an embodiment of the present invention, KBS 160 may be capable of providing resolution recommendations for a plurality of detected network failures by communicating with the troubleshooting system 150. In one embodiment, KBS 160 may be designed to apply formal representations of domain knowledge or expertise to solve network related problems. Symbolic descriptions (e.g., in the form of rules) of this expertise characterize the definitional and empirical relationships in a domain. This approach of knowledge models has been found advantageous in automating troubleshooting tasks that may become too complex to be accomplished by human experts. In an embodiment of the present invention, KBS 130 may comprise, or otherwise may cooperate with a rules engine 164 and RAN analysis engine software program 166. RAN analysis engine 166 may comprise program instructions stored on one or more computer-readable storage devices, which may include internal storage on the knowledge base system 160. RAN analysis engine 166 may be, for example, a computer program or program component utilized as the inference engine of knowledge based system 160 that matches the current inputs to relevant elements in knowledge base 160. In some embodiments, RAN analysis engine 166 may provide the means to re-assess the state of a situation during each cycle of a reasoning mechanism. As a result, RAN analysis engine 166 may be capable of reacting to a dynamic situation more readily than conventional programs.

Additionally, KBS 160 may include a user interface, such as graphical user interface (GUI) 162 program. In one embodiment, GUI 162 may comprise a framework for collecting user feedback from various users 168, such as network technicians, with respect to the actual causes of the reported network issues and with respect to recommended countermeasures. This historical information may be incorporated into the root cause analysis to provide more accurate recommendations as described in more detail below.

Figure 2:
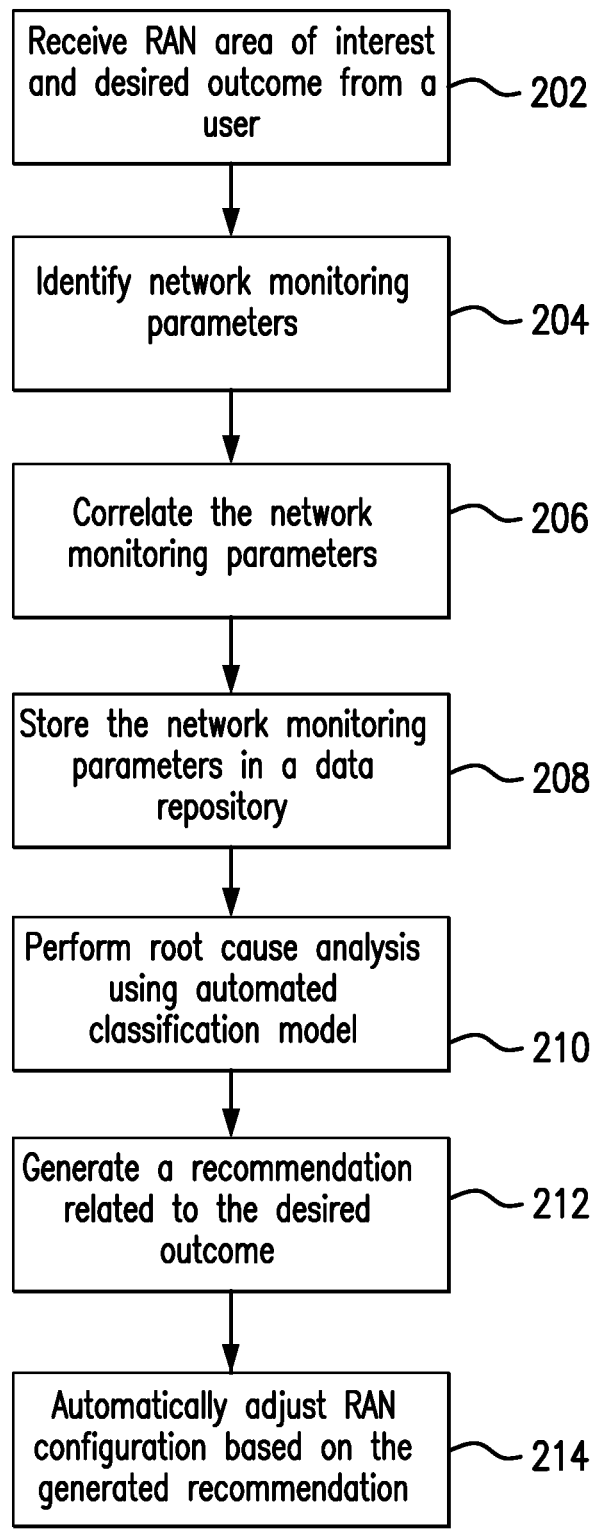
FIG. 2 is a flowchart illustrating operation of an embodiment of the present invention.

FIG. 2 is a flowchart illustrating operation of an embodiment of the present invention. Before turning to description of FIG. 2, it is noted that the flow diagram shown therein is described, by way of example, with reference to steps and/or elements shown in FIGS. 1, and 3A-3C, although these operational steps may be carried out in any system and are not limited to the scenario shown in the aforementioned figure. Additionally, the flow diagram in FIG. 2 illustrates an example in which operational steps are carried out in a particular order, as indicated by the lines connecting the blocks, but the various steps shown in this diagram can be performed in any order, or in any combination or subcombination. It should be appreciated that in some embodiments some of the steps described below may be combined into a single step. In some embodiments, one or more additional steps may be included.

According to an embodiment of the present invention, at step 202, the RAN analysis engine 166 receives RAN area of interest information and desired outcome information from the user 168 via GUI 162. In other words, at step 202, the user 168 indicates a geographical area of interest where RAN troubleshooting or RAN optimization is needed. For example, RAN area of interest may be as large as a particular geographical market or as small as a particular group of adjacent cells. RAN troubleshooting and/or RAN optimization may be related to network-based issues such as, but not limited to, subscriber accessibility (e.g., attaching to an access network), retainability (e.g., call drops), or Quality of Service (QoS) (e.g., capacity/speed of a serving cell of the access network, voice/video MOS (Mean Opinion Score)), and the like. The desired outcome indicates the requested improvement. For example, the desired outcome may include, but is not limited to, improved cell coverage, improved call drop counts, improved data speed, and improved QoS metric or a combination thereof.

At step 204, the RAN analysis engine 166 identifies and retrieves values for a plurality of wireless network monitoring parameters related to the identified network areas for optimization. The identified plurality of parameters may include both RAN performance data (e.g., WWAN performance data) and core network performance data. In other words, the RAN analysis engine 166 may obtain ever-increasing 2g, 3g, 4g, LTE, or 5g variables related to user and/or control plane signaling from one of the network elements, such as the base station 102, or probe instrumentations that may be stored in network signaling database 158, for example. Examples of RAN variables may include NEM parameters and cell based counters and subscriber RRC data, such as radio bearer abnormal drop counters, radio frequency parameters such as RF frequency (channel), RF power (reference signal received power (RSRP)), RF interference (reference signal received quality (RSRQ)), signal-to-interference-plus-noise-ratio (SINR), RF RRC retransmissions and the like. Core network variables may include signaling related to subscriber sessions and communication flows associated with the subscribers, such as subscriber QoS attributes. Additionally, core network variables may include subscriber user plane signaling and QoS attributes such as uplink/downlink bandwidth, TCP retransmissions, voice/video MOS as a measure of user's quality of experience, application deep packet classification (e.g., Facebook application, Skype application, and the like).

At step 206, the RAN analysis engine 166 correlates the network monitoring parameters to a particular cell or to a particular subscriber. In other words, the RAN analysis engine 166 correlates big data that may include the identified RAN variables, core network variables, subscriber data and network data received from the troubleshooting system 150. At least in some embodiments, the RAN analysis engine 166 may reduce the list of correlated parameters to the ones that are most relevant for generating a recommendation. In various embodiments, the RAN analysis engine 166 may filter the amount of big data to be analyzed to certain categories: cell area of interest, critical variables required by the desired outcome, NEM cell-based counters, RAN network element tables (locations of cell sites), and the like.

Optionally, at step 208, the RAN analysis engine 166 may store the correlated network monitoring parameters in a data repository. This step may involve database insertion and indexing of data structures. In one embodiment, the data repository may comprise a relational database system. However, a major problem with relational database systems is that a good relationship schema requires many tables having columns in common between them. Accordingly, it is often necessary to calculate many joins to execute queries. In some embodiments, more efficient systems may be used as data repositories, such as storage systems based on HDFS (Hadoop Distributed File System) cloud storage systems, for example.

According to embodiment of the present invention, at step 210, the RAN analysis engine 166 performs root cause analysis of identified and/or stored network monitoring parameters using automated classification model by applying one or more knowledge processing rules. Broadly, knowledge representation is the activity of making abstract knowledge explicit, as concrete data structures, to support machine-based storage, management (e.g., information location and extraction), and reasoning systems. Knowledge processing rules may be applied using the rules engine software component 164, e.g., implemented by programming instructions encoded in one or more tangible, non-transitory computer-readable storage media executed by one or more processors of the KBS 160 to provide the rules engine 164. According to embodiments of the present invention, these knowledge processing rules managed by the rules engine 164 may feed the machine learning based automated classification model. At least initial rule sets utilized by the rules engine 164 may include exemplary basic rules specifying typical RF power levels where drop calls start occurring and/or exemplary basic rules specifying RF interference levels where user's quality of experience starts dropping to unacceptable levels. As the automated classification model continually derives more information related to wireless network performance, the knowledge processing rules are selectively updated where relevant by the rules engine 164. The updated knowledge processing rules may be provided as real-time feedback by the rules engine 164 to the RAN analysis engine 166.

In various embodiments, the RAN analysis engine 166 utilizes one or more automated classification models that may utilize one of the automated machine learning techniques. Each model can cover a broad set of instances.

Conventional methods of incorporating machine learning, planning, and prediction have centered on three principal techniques. Statistical inference systems encompass not only traditional statistical analysis approaches (such as those supported by SAS and SPSS), but also machine learning capabilities based on clustering, Bayesian probabilities, decision trees, as well as partitioning and classification. Expert systems are if-then-else rule driven applications that apply an "inference engine" to evaluate rules and follow a path to a particular solution. The rules can be developed by subject matter experts or as part of a statistical analysis (in a manner similar to statistical interference systems) or through the process of data mining. The third technique is the use of neural networks, representing layered connectionist machines (either in software or hardware) that mimic the way neurons in the human brain supposedly collect data, aggregate related data elements, prioritize important data relationships, and learn patterns.

These approaches are not mutually exclusive. For example, rules can be generated by the statistical analysis of data patterns in a process known as "data mining." In one embodiment, the RAN analysis engine 166 may utilize connectionlist and/or Bayesian machine-learning techniques to perform the root cause analysis. These automated techniques rely on statistical analysis and provide means of using the large population of variables that typically influence performance of a particular cell (e.g., coverage, capacity, or Quality of Service). The foregoing description presents an exemplary embodiment of the Bayesian techniques of the present invention. It will be understood, however, that the present invention is not limited to the particular embodiment described, and several variations and enhancements can be implemented as desired or necessitated by operational requirements.

According to an embodiment of the present invention, at step 212, the RAN analysis engine 166 generates a recommendation related to the desired outcome based on the analysis performed at step 210. In various embodiments, the RAN analysis engine 166 provides meaningful predictive analysis of deployed radio cells, detect the existence of problem states within the wireless network, and/or perform root cause analysis. The RAN analysis engine 166 can preferably report problems that are either fully or partially "matched," along with a confidence factor (e.g., confidence probability) associated with each matched problem. The machine-learning can advantageously leverage network data (e.g., the information associated with the plurality of variables that influence performance of a particular cell) that is compiled in the automated classification model. For example, at step 212 the RAN analysis engine 166 may simply predict a root cause of a problem/issue with a wireless carrier network, such as dropped call or poor VoLTE MOS, based on the performed network data analysis. In another example, at step 212, the RAN analysis engine 166 may indicate a resolution/solution for the identified root cause of at least one service problem, such as, recommendation for additional cell tower or site or may recommend frequency change which improves cell coverage, for example. As another example, the generated recommendation may propose changes to the NEM configuration parameters, such as RF, MAC, and PHY parameters in such a way that minimizes the RF interference in the respective cluster of cells while maximizing the cell traffic capacity, as well as changing configuration of connections, links, and nodes. In other words, the recommendation may propose changes to radio frequency (RF) and physical layer (PHY) parameters of the cells (e.g., channel frequency, RF output power, segment). This may help to improve the intra-cell quality of service (QoS) by minimizing the intra-cell and inter-cell interference. As yet another non-limiting example, the generated recommendation could include recommendation to adjust antenna tilt and/or azimuth configuration and transmit power if the cell overlaps with different neighbor cells. The antenna tilt and transmit power level is used to communicate wireless signals in a cell. As noted above and as shown in FIGS. 3A-3C, the RAN analysis engine 166 may also generate confidence factors associated with each recommendation. At least in some embodiments, the generated recommendation may also include, but is not limited to, the degree of efficacy of the input variables that influenced the recommendation (which may be based on the theoretical design of Taguchi, for example).

At step 214, the RAN analysis engine 166 may optionally automatically adjust configuration(s) of one or more RAN parameters based on the generated recommendation. Such parameters may also be expressed in terms of an input to NEM Operations or SON functions allowing automatic or semiautomatic reconfiguration of the RAN system.

According to embodiments of the present invention, the automated classification model is a Bayesian statistical model that utilizes sets of knowledge processing rules. Expert knowledge is used to seed training of the model by a machine. This knowledge-based seeding of the model may more effectively create a predictive model. In some embodiments, the seed may represent relationships between the plurality of network monitoring parameters. At least some of the rules may include one or more preconditions associated with certain confidence factors based on the knowledge-based seeding. The reliability of the derived recommendation depends on each confidence factor utilized during derivation process. These confidence factors are indicative of the probability of occurrence of a corresponding cause. According to an embodiment of the present invention, the automated classification model utilized by the RAN analysis engine 166 is capable of improving credibility results for each derived recommendation as confidence factors can be automatically updated after each successful/unsuccessful prediction.

Table 1 below illustrates an exemplary rule set containing initial preset confidence factors (probabilities) for an exemplary cause code "radio coverage issue" associated with a particular problem of lost radio connection with a UE:

TABLE 1

| | P | P⁻ |
|---|---|---|
| UE lost | 0.95 | 0.05 |
| Serving Cell −120 dBm < RSRP < −100 dBm | 0.7 | 0.3 |
| Serving Cell RSRP < −120 dBm | 0.95 | 0.05 |
| Serving Cell is "Outdoor Cell" | 0.6 | 0.4 |

In table 1, P represents probability that a precondition is true and P⁻ represents probability that the precondition is false. The last row in table 1 represents probabilities assigned to a precondition that the serving cell is an outdoor cell, in case the NE table containing detailed information about each cell is not available to the RAN analysis engine 166.

Figure 3A:
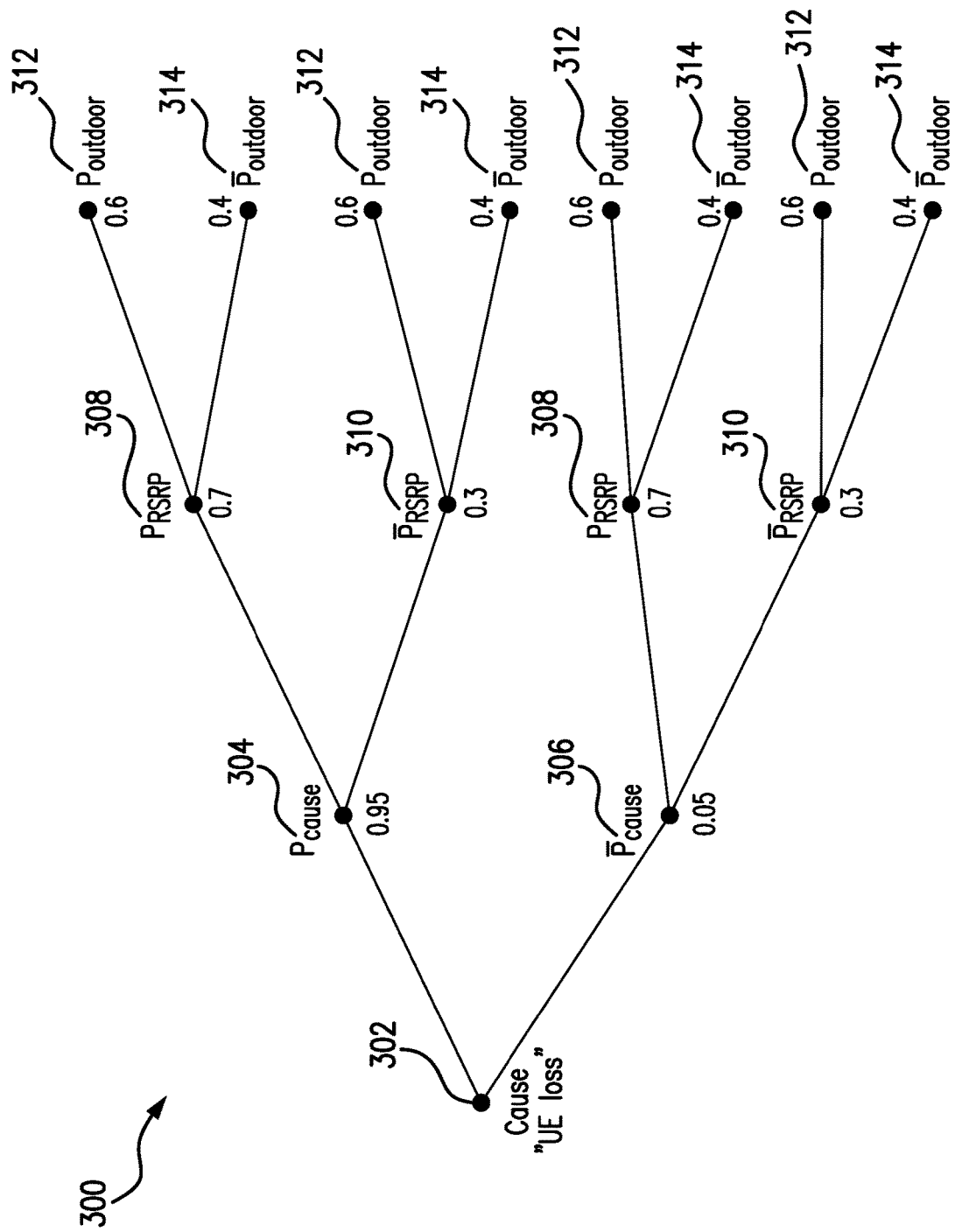
FIGS. 3A-3C depict examples of decision trees utilized by the automated classification model, accordance with an embodiment of the present invention.

FIG. 3A depicts an example of a decision tree utilized by the automated classification model, in accordance with an embodiment of the present invention. More specifically, the decision tree 300 depicted in FIG. 3A represents the rule set (both pre-conditions and corresponding confidence factors) stored in the Table 1. In FIG. 3A, nodes 304 and 306 represent true and false probabilities, respectively, for a particular cause, nodes 308 and 310 represent true and false probabilities, respectively, for serving cell RSRP values being between −120 dBm and −100 dBm, nodes 312 and 314 represent true and false probabilities, respectively, for a serving cell being an outdoor cell. According to an embodiment of the present invention, the RAN analysis engine 166 may determine a confidence factor that a root cause is an outdoor radio coverage issue by combining corresponding individual probabilities of preconditions 304, 308 and 312 using the decision tree 300. Using the example in FIG. 3A, the RAN analysis engine 166 determines confidence factor of root cause being an outdoor coverage issue=P (cause)*P (RSRP value being between −120 dBm and −100 dBm)*P (outdoor serving cell)=0.95*0.7*0.6=0.399=39.9%. Similarly, the RAN analysis engine 166 determines that probability of root cause being an indoor coverage issue=P (cause)*P (RSRP value being between −120 dBm and −100 dBm)*P (indoor serving cell)=0.95*0.7*0.4=0.266=26.6%. As yet another example, the RAN analysis engine 166 determines that probability of root cause being an outdoor radio coverage issue, while RSRP measurement is outside of the range between −120 dBm and −100 dBm=P(cause)*P (RSRP value being outside of the −120 dBm and −100 dBm range)*P (outdoor serving cell)=0.95*0.3* 0.6=0.171=17.1%. In a similar fashion, the RAN analysis engine 166 may determine confidence factors for each possible combination of nodes 304-314 in order to determine the most likely cause of the reported problem. In the illustrated case, the RAN analysis engine 166 may derive that the outdoor radio coverage issue is the most likely cause by comparing all computed confidence factors.

According to an embodiment of the present invention, the RAN analysis engine 166 may be configured to interact with the user 168 via the GUI 162. Continuing with the example of the outdoor radio coverage issue, the RAN analysis engine 166 may ask the user 168 to confirm that the location of interest is an outdoor cell. If user's response is affirmative, the RAN analysis engine 166 may automatically update corresponding probability. In other words, P (outdoor serving cell) 312 becomes 1. As another example, the RAN analysis engine 166 may ask the user 168 how sure he/she is that the root cause is a radio coverage issue. If the user 166 enters 90%, the RAN analysis engine 166 updates $P_{RSRP}$ 308 with probability value equal to 0.9. After the update, the RAN analysis engine 166 may recalculate the confidence factor of root cause being an outdoor coverage issue=P (cause)*P (RSRP value being between −120 dBm and −100 dBm)*P (outdoor serving cell)=0.95*0.9*1=0.855=85.5% As illustrated in this example, interaction with the user 166 can dramatically increase confidence factor of the predicted root cause of the problem.

Generally, all causes could be grouped into two different classifications—normal releases and abnormal releases, for example. Normal releases may include, but not limited to the following: "User inactivity," "Load balancing tracking area update required," "CS (circuit switched) fall back triggered," "UE not available for PS (packet switched) service," "Normal release," "Detach," "Successful handover," "inter-RAT(Radio Access Technologies)Redirection," and the like. Abnormal releases may include, but are not limited to the following: "Unspecified", "Release due to E-UTRAN generated reason," "Handover target not allowed," "Cell not available," "No radio resources available in target cell," "Unknown or already allocated MME UE S IAP ID," "Unknown or inconsistent pair of UE S IAP ID," "Radio connection with UE lost," "Load balancing TAU (Tracking Area Update) required," "Failure in the radio interface procedure," "Interaction with other procedure," "Unknown E-RAB (E-UTRAN Radio Access Bearer) ID", "encryption and/or integrity protection algorithms not supported," "invalid CSG (Closed Subscriber Group) id," "Transport resource unavailable," "Control processing overload," "Hardware failure," and the like.

Figure 3B:
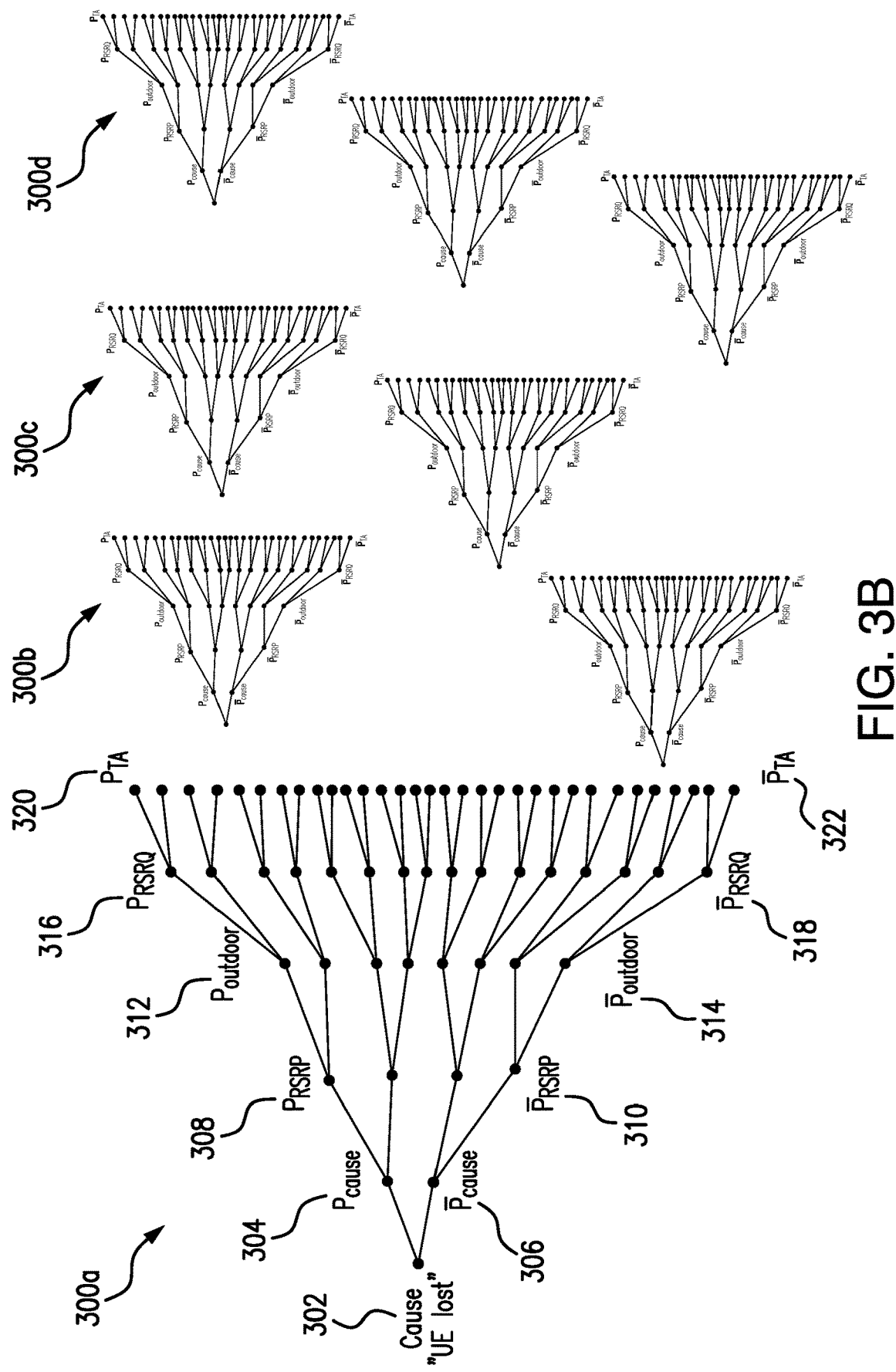

It should be noted that each RAN parameter added to a particular decision tree doubles the number of decision points (nodes). According to an embodiment of the present invention, the RAN analysis engine 166 may utilize a plurality of decision trees, wherein each decision tree represents a rule set associated with a particular cause. FIG. 3B depicts an example of the plurality of decision trees utilized by the automated classification model, in accordance with an embodiment of the present invention. Each of the two additional RAN parameters RSRQ 316 and distance from the serving cell 320 double the number of decision points in the decision tree 300a, as compared to the decision tree 300 in FIG. 3A. Furthermore, FIG. 3B illustrates a plurality of decision trees 300a-300d where each decision tree represents a rule set associated with a particular cause.

Figure 3C:
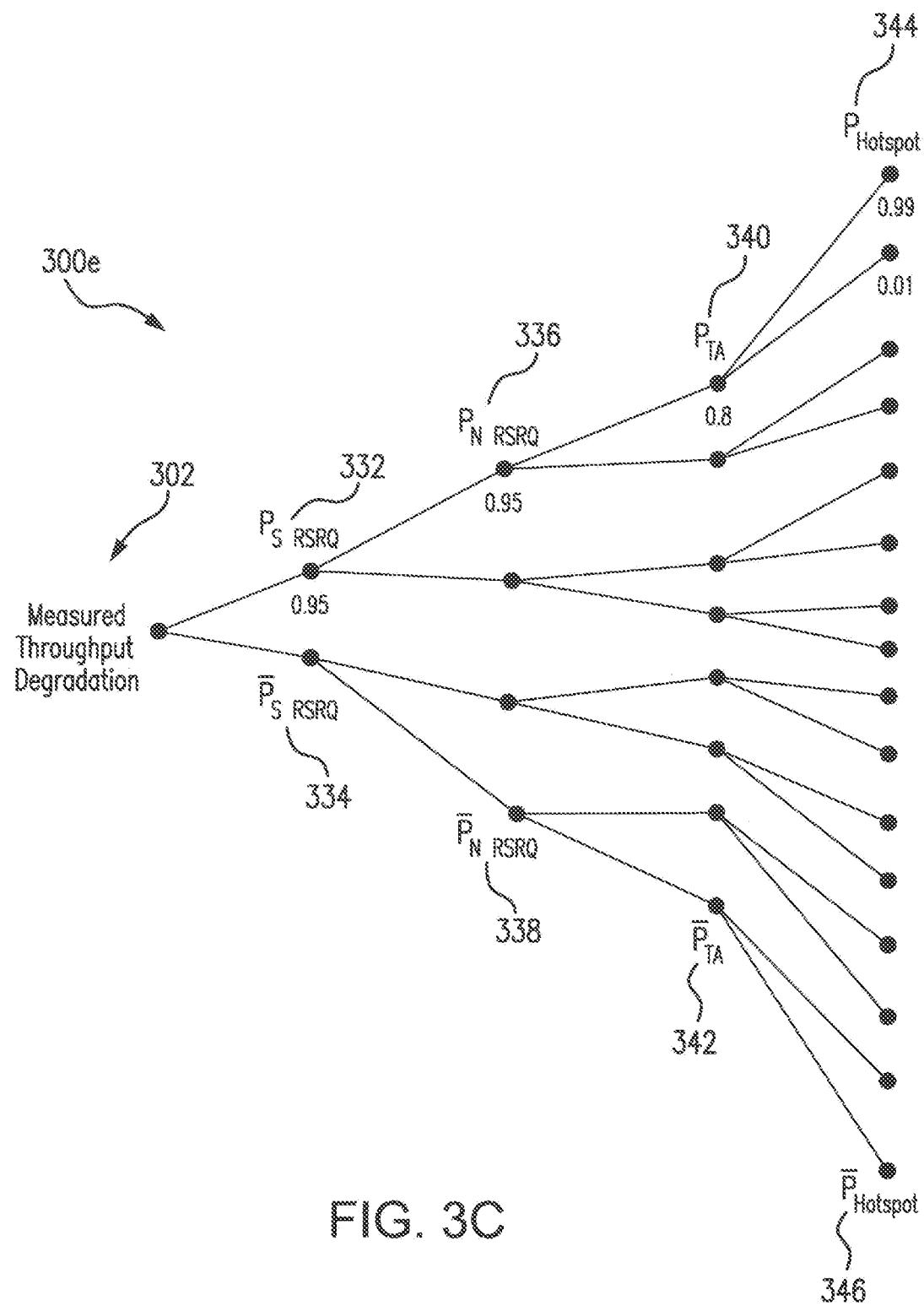

FIG. 3C depicts yet another example of a decision tree that may be utilized by the automated classification model, in accordance with an embodiment of the present invention. The decision tree 300e is associated with the measured throughput degradation. Generally, throughput degradation may be determined by comparing measured cell throughput value with a reference value, such as mean cell throughput of the entire network or mean cell throughput of a particular market or mean cell throughput of a particular coverage area.

Table 2 below illustrates an exemplary rule set containing initial preset confidence factors (probabilities) for an exemplary cause code "radio interference cell edge" associated with the throughput degradation problem:

TABLE 2

|  | P | P⁻ |
|---|---|---|
| Serving Cell RSRQ < −16 dBm | 0.95 | 0.05 |
| Neighbor Cell(s) RSRQ < −16 dBm | 0.95 | 0.05 |

TABLE 2-continued

|  | P | P⁻ |
|---|---|---|
| Distance from Serving cell (TA) > 800 m | 0.8 | 0.2 |
| Traffic Hotspot detected at location with distance from serving cell > 800 m | 0.99 | 0.01 |

The decision tree 300e depicted in FIG. 3C represents the rule set (both pre-conditions and corresponding confidence factors) stored in the Table 2. In FIG. 3C, nodes 332 and 334 represent true and false probabilities, respectively, for serving cell's RSRQ value being less than −16 dBm, nodes 336 and 338 represent true and false probabilities, respectively, for neighbor cell RSRP values being less than −16 dBm, nodes 340 and 342 represent true and false probabilities, respectively, for distance from serving cell being greater than 800 meters, and nodes 344 and 346 represent true and false probabilities, respectively, for traffic hotspot detected at location with distance from serving cell greater than 800 m.

According to an embodiment of the present invention, the RAN analysis engine 166 may use the decision tree 300e to determine confidence factor that the root cause of the throughput degradation is a concentration of subscribers that generate high demand for downlink traffic at serving cell edge by combining corresponding individual probabilities of preconditions 332, 336 and 340 and 344. Using the example in FIG. 3C, the RAN analysis engine 166 determines confidence factor of the root cause of the throughput degradation is a concentration of subscribers that generate high demand for downlink traffic at serving cell edge=$P_{S\_RSRQ}*P_{N\_RSRQ}*P_{TA}*P_{Hotspot}$=0.95*0.95*0.8*0.99=0.715=71.5%. Similarly, the RAN analysis engine 166 determines confidence factor that the root cause of the throughput degradation are few subscribers that generate high demand for downlink traffic while unexpectedly located at the serving cell edge=$P_{S\_RSRQ}*P_{N\_RSRQ}*P_{TA}*P^-_{Hotspot}$=0.95*0.95*0.8*0.01=0.007=0.7%. In the illustrated case, the RAN analysis engine 166 may derive that the root cause of the throughput degradation is a concentration of subscribers that generate high demand for downlink traffic at serving cell edge by comparing all computed confidence factors. In this case, at step 212 (shown in FIG. 2), the RAN analysis engine 166 may generate a recommendation to consider deployment of a small network cell in the detected hot spot area.

Advantageously, the various embodiments described herein provide automated techniques for troubleshooting failures in a telecommunication network by analyzing actual network and subscriber data. The aforementioned embodiments use knowledge based model containing rule sets that can significantly reduce troubleshoot and repair time. Furthermore, the automated system disclosed herein is preferably configured to provide confidence factors associated with each recommendation, which could substantially eliminate guesswork by network operators.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
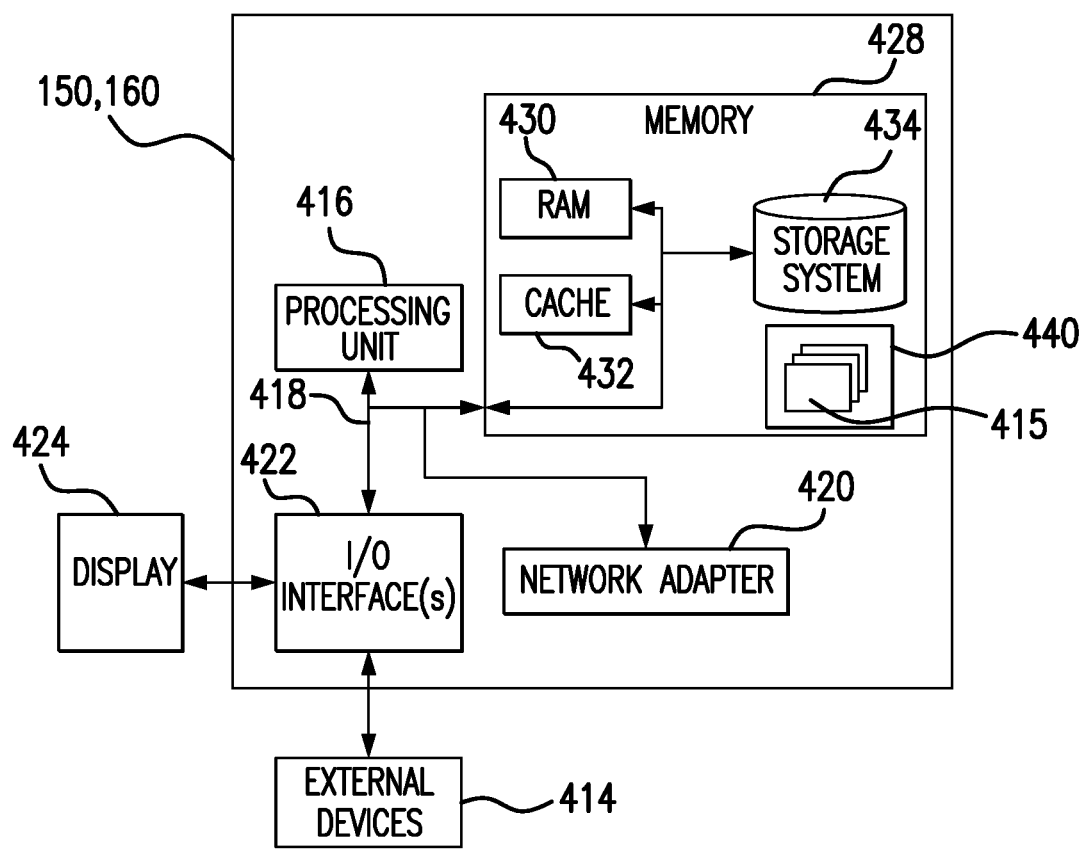
FIG. 4 illustrates external and internal components of system computers of FIG. 1 in accordance with an illustrative embodiment of the present invention.

FIG. 4 illustrates internal and external components of the troubleshooting system 150 and KBS 160 servers in accordance with an illustrative embodiment. The servers 150 and 160 are only examples of a suitable server computer and are not intended to suggest any limitation as to the scope of use or functionality of embodiments of the invention described herein. Regardless, the servers 150 and 160 are capable of being implemented and/or performing any of the functionality set forth hereinabove.

The servers 150 and 160 are operational with numerous other general purpose or special purpose computing system environments or configurations. Examples of well-known computing systems, environments, and/or configurations that may be suitable for use with the servers 150 and 160 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The servers 150 and 160 may be described in the general context of computer system-executable instructions, such as program modules, being executed by a computer system. Generally, program modules may include routines, programs, objects, components, logic, data structures, and so on that perform particular tasks or implement particular abstract data types. The servers 150 and 160 may be practiced in distributed data processing environments where tasks are performed by remote processing devices that are linked through a communications network. In a distributed data processing environment, program modules may be located in both local and remote computer system storage media including memory storage devices.

The servers 150 and 160 are shown in FIG. 4 in the form of a general-purpose computing device. The components of the servers 150 and 160 may include, but are not limited to, one or more processors or processing units 416, a system memory 428, and a bus 418 that couples various system components including the system memory 428 to the processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The servers 150 and 160 typically include a variety of computer system readable media. Such media may be any available media that is accessible by the servers 150 and 160, and it includes both volatile and non-volatile media, removable and non-removable media.

The system memory 428 can include computer system readable media in the form of volatile memory, such as random access memory (RAM) 430 and/or cache memory 432. The servers 150 and 160 may further include other removable/non-removable, volatile/non-volatile computer system storage media. By way of example only, a storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the memory 428 may include at least one program product having a set (e.g., at least one) of program modules that are configured to carry out the functions of embodiments of the invention.

A program/utility 440, having a set (at least one) of program modules 415, such as the GUI 162, rules engine 164, and RAN analysis engine 166, may be stored in the memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the invention as described herein.

The servers 150 and 160 may also communicate with one or more external devices 414 such as a keyboard, a pointing device, a display 424, etc.; one or more devices that enable a user to interact with the servers 150 and 160; and/or any devices (e.g., network card, modem, etc.) that enable the servers 150, 160 to communicate with one or more other computing devices. Such communication can occur via Input/Output (I/O) interfaces 422. Still yet, the servers 150, 160 can communicate with one or more networks such as a local area network (LAN), a general wide area network (WAN), and/or a public network (e.g., the Internet) via a network adapter 420. As depicted, the network adapter 420 communicates with the other components of the servers 150, 160 via the bus 418. It should be understood that although not shown, other hardware and/or software components could be used in conjunction with the servers 150, 160. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing a radio access network, the method comprising steps of:
   receiving at least one area of the radio access network to be analyzed from a user and receiving a desired outcome from a user;
   identifying a plurality of network monitoring parameters related to a user requested analysis including user data and control plane data;
   correlating the identified plurality of network monitoring parameters;
   performing a root cause analysis using an automated classification model based on the correlated plurality of network monitoring parameters;
   generating a recommendation related to the desired outcome based on the performed root cause analysis;
   confirming with the user one or more aspects of the recommendation via a Graphical User Interface (GUI) which confirmation includes repeating the performance of the root cause analysis based upon a user entered numerical value indicative of the user's percentage certainty of the performed root cause analysis; and
   updating the generated recommendation based upon the user confirmation and wherein the generated recommendation includes a confidence factor of a root cause by combining corresponding individual probabilities of preconditions.

2. The method of claim 1, wherein the automated classification model comprises at least one of a Bayesian network model and an expert system model, wherein the Bayesian network model is a machine-learned Bayesian network with a seed for training the Bayesian network model provided from an expert in a network domain and wherein the seed represents relationships between the plurality of network monitoring parameters.

3. The method of claim 2, wherein the step of performing the root cause analysis includes calculating confidence probability.

4. The method of claim 3, wherein the generated recommendation includes the calculated confidence probability.

5. The method of claim 2, wherein the automated classification model comprises one or more decision trees.

6. The method of claim 2, wherein the expert system model comprises a rules based model having a plurality of rules based on knowledge developed from one or more experts relating to interpreting values of the identified plurality of network monitoring parameters with respect to the desired outcome.

7. The method of claim 1, further comprising storing the correlated network monitoring parameters in a data repository.

8. The method of claim 1, further comprising automatically adjusting configuration of the radio access network based on the generated recommendation.

9. A system for optimizing a radio access network, the system comprising:
a processor and a memory device coupled to the processor, the memory device containing a set of instructions that, when executed by the processor, cause the processor to:
receive at least one area of the radio access network to be analyzed from a user and receive a desired outcome from a user;
identify a plurality of network monitoring parameters related to a user requested analysis including user data and control plane data;
correlate the identified plurality of network monitoring parameters;
perform a root cause analysis using an automated classification model based on the correlated plurality of network monitoring parameters;
generate a recommendation related to the desired outcome based on the performed root cause analysis;
confirm with the user one or more aspects of the recommendation via a Graphical User Interface (GUI) which confirmation includes repeating the performance of the root cause analysis based upon a user entered numerical value indicative of the the user's percentage certainty of the performed root cause analysis; and
update the generated recommendation based upon the user confirmation and wherein the generated recommendation includes a confidence factor of a root cause by combining corresponding individual probabilities of preconditions.

10. The system of claim 9, wherein the automated classification model comprises at least one of a Bayesian network model and an expert system model, wherein the Bayesian network model is a machine-learned Bayesian network with a seed for training the Bayesian network model provided from an expert in a network domain and wherein the seed represents relationships between the plurality of network monitoring parameters.

11. The system of claim 10, wherein the set of instructions to perform the root cause analysis that, when executed by the processor, further cause the processor to calculate confidence probability.

12. The system of claim 11, wherein the generated recommendation includes the calculated confidence probability.

13. The system of claim 10, wherein the automated classification model comprises one or more decision trees.

14. The system of claim 9, wherein the set of instructions that, when executed by the processor, further cause the processor to store the correlated network monitoring parameters in a data repository.

15. The system of claim 9, wherein the set of instructions that, when executed by the processor, further cause the processor to automatically adjust configuration of the radio access network based on the generated recommendation.

16. The system of claim 10, wherein the expert system model comprises a rules based model having a plurality of rules based on knowledge developed from one or more experts relating to interpreting values of the identified plurality of network monitoring parameters with respect to the desired outcome.

17. A tangible, non-transitory, computer-readable media having software encoded thereon, the software, when executed by a processor, operable to:
receive at least one area of the radio access network to be analyzed from a user and receive a desired outcome from a user;
identify a plurality of network monitoring parameters related to a user requested analysis including user data and control plane data;
correlate the identified plurality of network monitoring parameters;
perform a root cause analysis using an automated classification model based on the correlated plurality of network monitoring parameters;
generate a recommendation related to the desired outcome based on the performed root cause analysis;
confirm with the user one or more aspects of the recommendation via a Graphical User Interface (GUI) which confirmation includes repeating the performance of the root cause analysis based upon a user entered numerical value indicative of the the user's percentage certainty of the performed root cause analysis; and
update the generated recommendation based upon the user confirmation and wherein the generated recommendation includes a confidence factor of a root cause by combining corresponding individual probabilities of preconditions.

18. The computer-readable media of claim 17, wherein the automated classification model comprises at least one of a Bayesian network model and an expert system model, wherein the Bayesian network model is a machine-learned Bayesian network with a seed for training the Bayesian network model provided from an expert in a network domain and wherein the seed represents relationships between the plurality of network monitoring parameters.

19. The computer-readable media of claim 18, wherein the software to perform the root cause analysis that, when executed by the processor, operable to calculate confidence probability.

20. The computer-readable media of claim 19, wherein the generated recommendation includes the calculated confidence probability.

* * * * *